United States Patent
Koma

[11] Patent Number: 6,115,100
[45] Date of Patent: Sep. 5, 2000

[54] VERTICALLY ALIGNED LIQUID CRYSTAL DISPLAY

[75] Inventor: Norio Koma, Motosu-Gun, Japan

[73] Assignee: Sanyo Electric Co., Ltd., Osaka, Japan

[21] Appl. No.: 09/169,154

[22] Filed: Oct. 9, 1998

[30] Foreign Application Priority Data

Oct. 13, 1997 [JP] Japan ..................................... 9-279022

[51] Int. Cl.[7] ....................... G02F 1/1337; G02F 1/1343; G02F 1/13
[52] U.S. Cl. ........................... 349/181; 349/130; 349/143
[58] Field of Search ..................................... 349/130, 181, 349/143

[56] References Cited

U.S. PATENT DOCUMENTS 5,309,264  5/1994  Lien et al. ............................... 349/143
5,621,558  4/1997  Shimada et al. ......................... 349/130
5,710,609  1/1998  Shimada ................................. 349/130

FOREIGN PATENT DOCUMENTS 0 341 702  11/1989  European Pat. Off. .

Primary Examiner—William L. Sikes
Assistant Examiner—Toan Ton
Attorney, Agent, or Firm—Hogan & Hartson LLP

[57] ABSTRACT

A vertically aligned type liquid crystal display includes a liquid crystal layer containing vertically aligned liquid crystal molecules and disposed between a plurality of pixel electrodes and a common electrode, wherein the orientation of the liquid crystal molecules is controlled by electric field, and wherein an refraction anisotropy $\Delta n$ of the liquid crystal used in the liquid crystal layer and a cell gap d [$\mu$m] which is a distance between the pixel electrodes and the common electrode are selected to satisfy $\Delta n \cdot d \leq -0.033 * d + 0.88$. With this configuration, a sufficiently wide range of driving voltages and an improved response speed are achieved.

4 Claims, 6 Drawing Sheets

VERTICALLY ALIGNED LIQUID CRYSTAL DISPLAY

BACKGROUND OF THE INVENTION

1. Field of the Invention

The present invention relates to a liquid crystal display (LCD) which utilizes opto-electric anisotropy of liquid crystal, and more particularly to a liquid crystal display which achieves an improved response speed.

2. Description of the Related Art

LCDs are compact, thin, and low power consumption devices and have been developed for practical use in the field of office automation (OA) and audio-visual (AV) equipment. In particular, active matrix type LCDs which utilize thin film transistors (TFTS) as switching elements are theoretically capable of static driving at a duty ratio of 100% in a multiplexing manner, and have been used in large screen and high resolution type animation displays.

TFTs are field effect transistors arranged in a matrix on a substrate and connected to individual pixel electrodes which construct one electrode of pixel capacitors with a dielectric layer made of liquid crystal. In a TFT matrix, TFTs located on the same row are simultaneously turned on/off by a given gate line, and each TFT of that row receives a pixel signal voltage from a given drain line. A display voltage is accumulated in the pixel capacitors corresponding to the on-state TFTs and designated by rows and columns. The pixel electrodes and the TFTs are formed on the same substrate, while a common electrode acting as the other electrode of the pixel capacitors is formed on the entire surface of the second substrate opposite to the first substrate across the liquid crystal layer. That is, the display pixels (i.e., pixels) are defined by partitioning the liquid crystal and the common electrode by pixel electrodes. The voltage accumulated in the pixel capacitors is held insulated by an off-state resistance of the TFTs for one field period or one frame period until the TFTs are turned on again. The liquid crystal is opto-electrically anisotropic, and its transmittance is controlled based on the voltage applied to respective pixel capacitors. The transmittance of each display pixel is independently controlled, so that individual pixels are observed bright or dark and recognized collectively as a display image by human eyes.

Initial orientation of the liquid crystal is determined by an orientation film disposed at the interface between the liquid crystal and each substrate. For example, a twisted nematic (TN) type LCD uses the liquid crystal in nematic phase which has positive dielectric anisotropy and whose alignment vectors are twisted 90 degrees between opposing substrates. Typically, a polarizing plate is provided on the outside of each substrate, and a polarizing axis of each polarizing plate coincides with the orientation of the liquid crystal located in the vicinity of the corresponding substrate. When no voltage is applied, linearly polarized light passes through one polarizing plate, turns its direction in the liquid crystal layer along the twisted alignment of the liquid crystal, and exits from the other polarizing plate, resulting in a "white" display. When the voltage is then applied to the pixel capacitors, an electric field is created within the liquid crystal and the orientation of the liquid crystal is changed to be parallel to the direction of the applied electric field because of dielectric anisotropy. This results in the collapse of twisted alignment and less frequent turns of the linearly polarized incoming light in the liquid crystal. Consequently, the amount of light being ejecting from the other polarizing plate is reduced and the display gradually becomes black. This is known as a normally white mode which is widely applied in the field of TN cells, in which the display is white when no voltage is applied and changes to "black" upon application of the voltage.

FIGS. 1 and 2 show a unit pixel structure of a conventional liquid crystal display, wherein FIG. 1 is a plan view and FIG. 2 is a sectional view along line G—G of FIG. 1. A gate electrode 101 made of a metal, such as Cr, Ta, or Mo, is formed on a substrate 100, and a gate insulating film 102 made of, e.g., SiNx and/or $SiO_2$ is formed to cover the gate electrode 101. A p-Si film 103 is formed on the gate insulating film 102. An implantation stopper 104 is patterned on the p-Si film 103 using the gate electrode 101 as a patterning mask. This implantation stopper 103 is used to form a lightly doped region (LD) having a low concentration (N−) of impurities, such as P or As, and source and drain regions (S, D) having a high concentration (N+) of impurities located outside the LD region in the p-Si film 103. A region of the p-Si film 103 located immediately below the implantation stopper 104 is an intrinsic layer which includes substantially no impurities and acts as a channel region (CH). The p-Si 103 is covered with an interlayer insulating film 105 made of SiNx or the like. A source electrode 106 and a drain electrode 107, both made of a material such as Al, Mo, or the like, are formed on the interlayer insulating film 105, each electrode being connected to the source region S and the drain region D, respectively, via a contact hole CT1 formed in the interlayer insulating film 105. The entire surface of the thus formed TFT is covered with a planarization insulating film 108 made of SOG (spin on glass), BPSG (boro-phospho silicate glass), acrylic resin, or the like. A pixel electrode 109 made of ITO (indium tin oxide) or the like is formed on the planarization insulating film 108 for driving the liquid crystal, and is connected to the source electrode 106 via a contact hole CT2 formed in the planarization insulating film 108.

An orientation film 120 formed by a macro molecular film, such as polyimide, is disposed on the entire surface on the above elements and undergoes a rubbing treatment to control an initial orientation of the liquid crystal. Meanwhile, a common electrode 131 made of ITO is formed on the entire surface of another glass substrate 130 arranged opposite to the substrate 100 across a liquid crystal layer. The common electrode 131 is covered with an orientation film 133 made of polyimide or the like which has undergone rubbing.

As shown herein, a DAP (deformation of vertically aligned phase) type LCD uses a nematic phase liquid crystal 140 having negative dielectric anisotropy, and orientation films 120, 133 formed by a vertical orientation film. The DAP type LCD is one of the electrically controlled birefringence (ECB) type LCDs which use a difference of refractive indices of longer and shorter axes of a liquid crystal molecule, so-called birefringence, to control transmittance. In the DAP type LCD, upon application of a voltage, incoming light transmits to one of two orthogonal polarization plates and enters the liquid crystal layer as linearly polarized light, and is birefracted in the liquid crystal to become elliptically polarized light. Then, retardation, which is a difference of phase velocity between ordinary and extraordinary ray components in the liquid crystal, is controlled according to an intensity of the electric field in the liquid crystal layer to allow the light to be emitted from the other polarization plate at a desired transmittance. In this case, the display is in a normally black mode, since the display is black when no voltage is applied and changes to white upon application of an appropriate voltage.

As described above, the liquid crystal display displays an image at an intended transmittance or color phase by applying a desired voltage to the liquid crystal sealed between a pair of substrates having predetermined electrodes formed thereon and by controlling a turning route or a birefringence of light in the liquid crystal. Specifically, the retardation is controlled by changing the alignment of the liquid crystal, to thereby adjust the light intensity of the transmitted light in the TN mode, while allowing the separation of color phases in the ECB mode by controlling a spectroscopic intensity depending on wavelength. However, the problem of a slower response speed caused by the orientation control of liquid crystal has not been solved.

SUMMARY OF THE INVENTION

The present invention is made to solve the above problem and provide a configuration to achieve an increased response speed of liquid crystal.

According to the present invention, a vertically aligned liquid crystal display includes a liquid crystal layer containing vertically aligned liquid crystal molecules and disposed between a plurality of pixel electrodes and a common electrode facing the plurality of pixel electrodes, wherein the orientation of the liquid crystal layer is controlled by an electric field, and wherein a relationship between a refraction anisotropy $\Delta n$ of liquid crystal used in the liquid crystal layer and a cell gap d [$\mu$m] which is a distance between the pixel electrodes and the common electrode satisfies $\Delta n \cdot d \leq -0.033*d+0.88$, whereby the response speed of the liquid crystal is speeded up.

In another aspect of the present invention, the liquid crystal layer having the above relationship of the refraction anisotropy $\Delta n$ and the distance d satisfies $$(\tau\gamma+\tau d)/2 \leq 80 \text{ msec}$$

where $\tau\gamma$ is time taken to reach a transmittance of 90% upon application of a voltage, and $\tau d$ is time taken to reach a transmittance of 10% after the voltage application is stopped.

By satisfying the above relationship, it is ensured that the liquid crystal display achieves a practical response speed.

In still another aspect of the present invention, an orientation window is formed in the common electrode in an area corresponding to the pixel electrodes for controlling the orientation of the liquid crystal molecules for each pixel.

Provision of the orientation window widens a viewing angle of the display, while preventing the occurrence of uneven disclination to thereby improve display quality.

DESCRIPTION OF THE PREFERRED EMBODIMENTS

Figure 1:
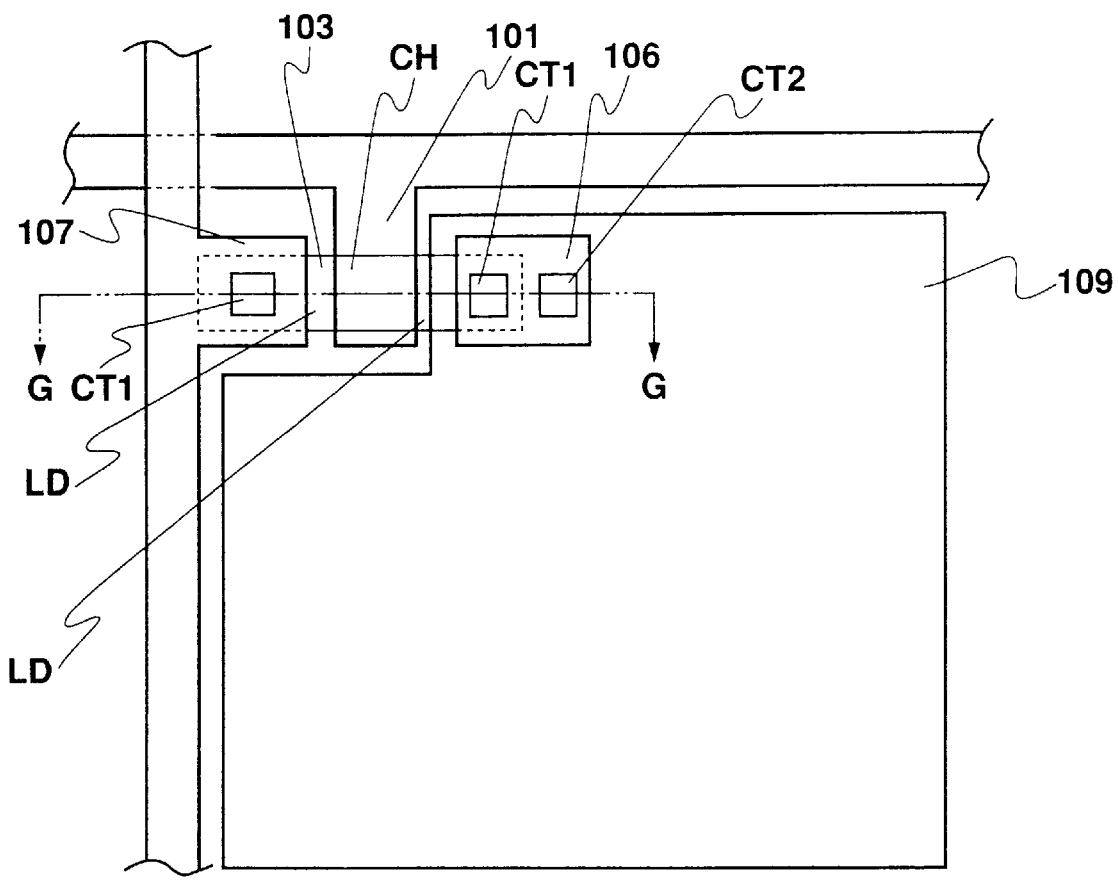
FIG. 1 is a plan view showing a unit pixel of a conventional liquid crystal display.
Figure 2:
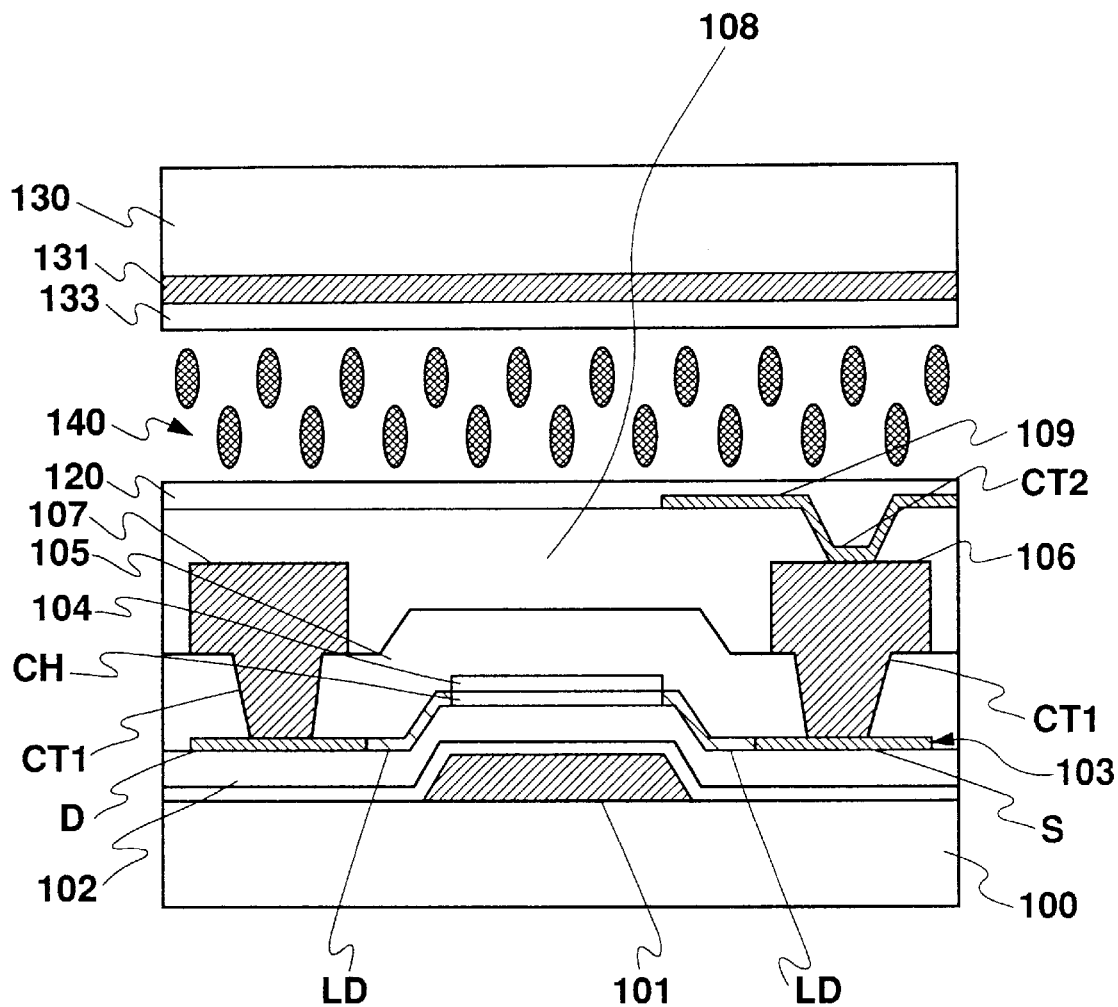
FIG. 2 is a sectional view taken along line G—G of FIG. 1.
Figure 3:
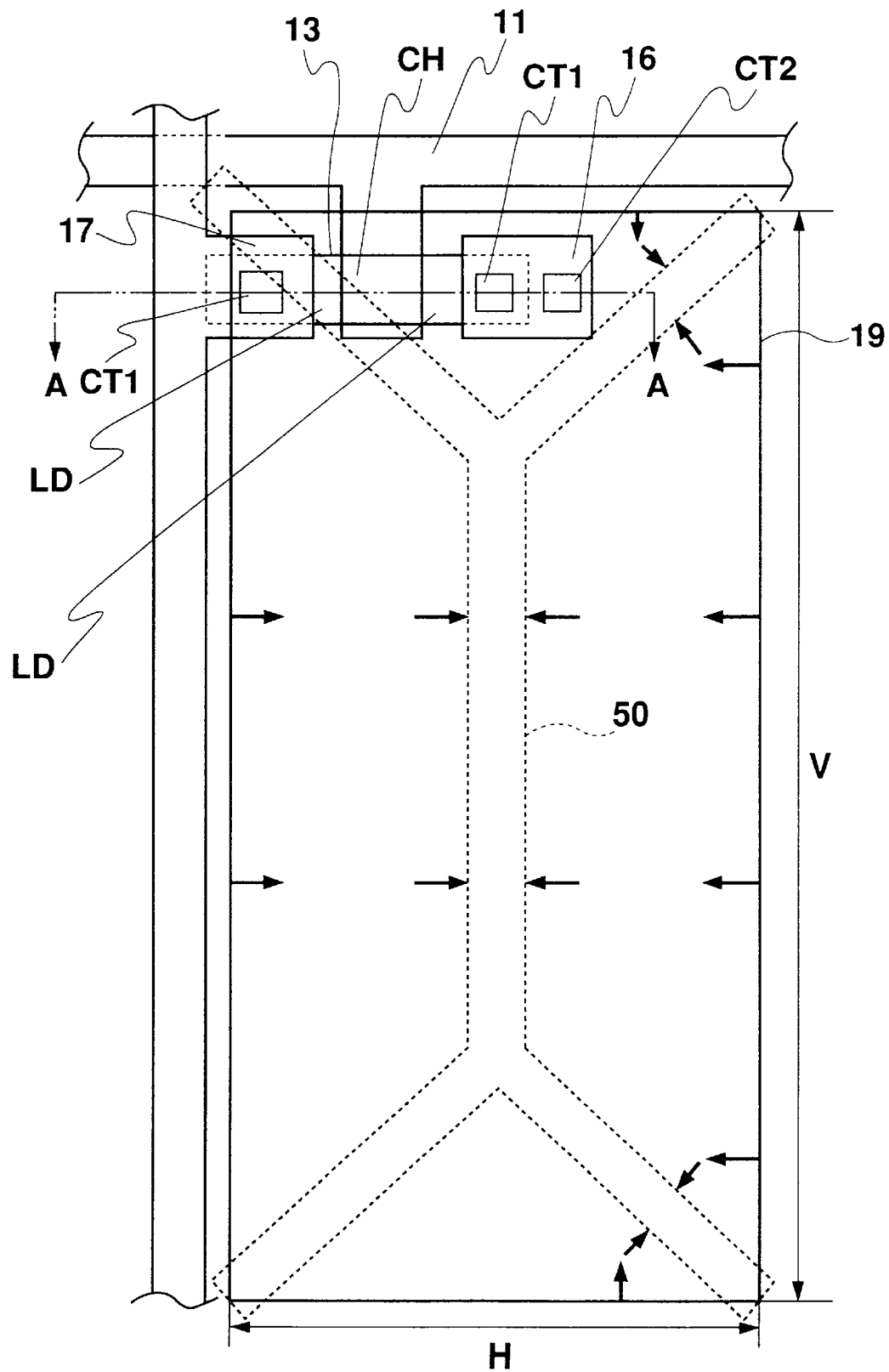
FIG. 3 is a plan view showing a unit pixel of a liquid crystal display according to a first embodiment of the present invention.
Figure 4:
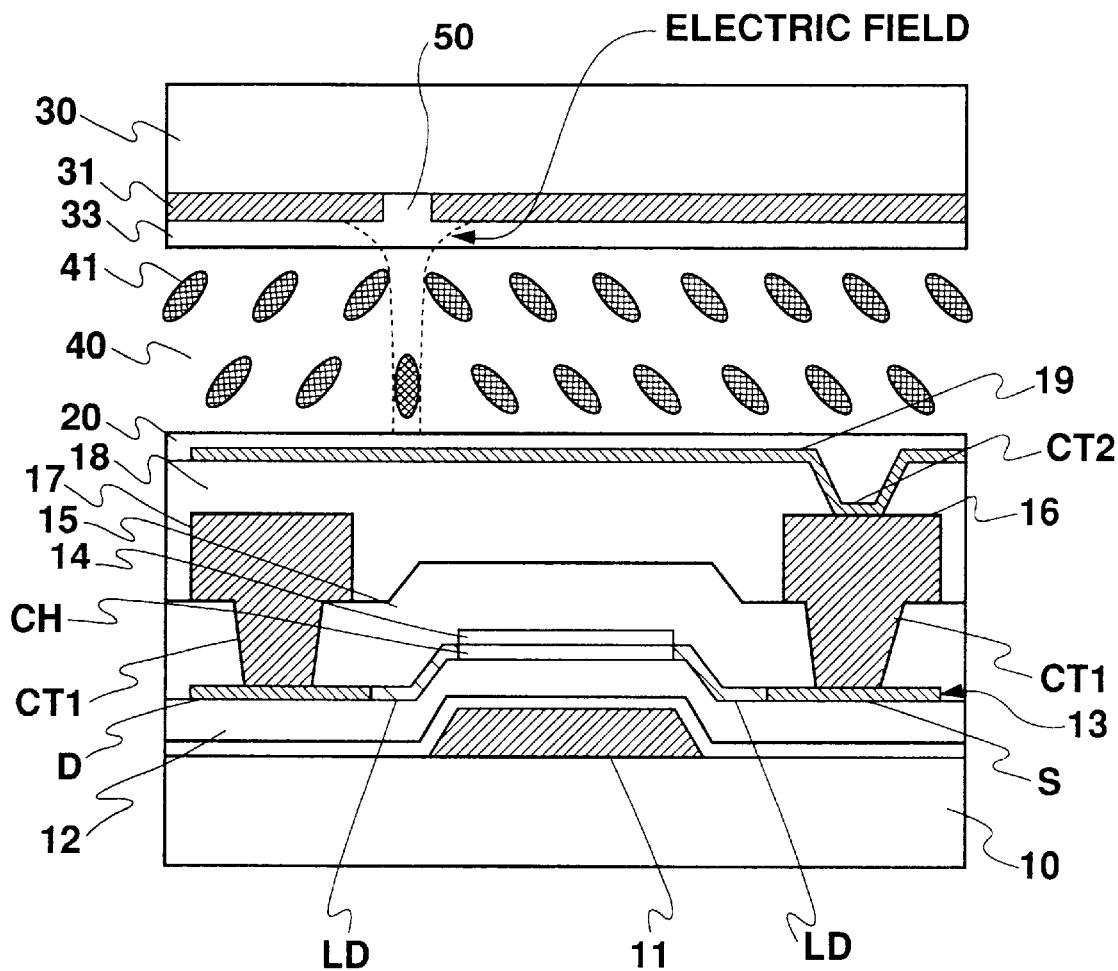
FIG. 4 is a sectional view taken along line A—A of FIG. 3.

Referring to FIGS. 3 and 4, a unit pixel structure of a liquid crystal display according to the present invention is shown, wherein FIG. 3 is a plan view and FIG. 4 is a sectional view taken along line A—A of FIG. 3. A gate electrode 11 made of a metal, such as Cr, Ta, or Mo, is formed on a substrate 10, and a gate insulating film 12 made of, e.g., SiNx and/or $SiO_2$ is formed to cover the gate electrode 11. A p-Si film 13 is formed on the gate insulating film 12. An implantation stopper 14 is formed on the p-Si film 13 and patterned using the gate electrode 11 as a patterning mask. This implantation stopper 14 is used to form a lightly doped region (LD) having a low concentration (N−) of impurities, such as phosphorous or arsenic, and source and drain regions (S, D) having a high concentration (N+) of impurities located outside the LD region in the p-Si film 13. A region of the p-Si film 13 located immediately below the implantation stopper 14 is an intrinsic layer which includes substantially no impurities and acts as a channel region (CH). The p-Si film 13 is covered with an interlayer insulating film 15 made of SiNx or the like. A source electrode 16 and a drain electrode 17, both made of Al, Mo, or the like, are formed on the interlayer insulating film 15, each electrode being connected to the source region S and the drain region D of the p-Si film 13, respectively, via a contact hole CT1 formed in the interlayer insulating film 15. The entire surface of the thus formed TFT is covered with a planarization insulating film 18 made of SOG (spin on glass), BPSG (boro-phospho silicate glass), acrylic resin, or the like. A pixel electrode 19 made of ITO (indium tin oxide) or the like is formed on the planarization insulating film 18 for driving the liquid crystal, and is connected to the source electrode 16 via a contact hole CT2 formed in the planarization insulating film 18.

An orientation film 20 formed by a macro molecular film, such as polyimide, is formed on the entire surface of the above elements, while a common electrode 31 made of ITO for acting as an electrode opposite to the pixel electrodes is formed on the entire surface of another glass substrate 30 arranged opposite to the substrate 10 across a liquid crystal layer. The common electrode 31 is covered with an orientation film 33 made of polyimide or the like. In the present invention, materials of the orientation films 20, 33 and the liquid crystal 40 are selected so that liquid crystal molecules 41 are aligned vertically.

In addition, an orientation control window 50 is formed in the common electrode 31 facing the pixel electrode 19 in the form of two upper and lower Y-shaped slits connected symmetrically to each other near the center of the pixel electrode. Since the electric field applied to the liquid crystal molecules 41 located below the orientation control window 50 is not sufficiently strong to tilt those molecules 41, they have vertical alignment. Around these molecules 41, however, the electric field is created as indicated by a dotted line in FIG. 4, which controls the molecules 41 to direct their longer axes perpendicular to the applied field. This is also true at the edge sections of the pixel electrode 19 and the longer axes of the liquid crystal molecules 41 are oriented perpendicularly to the electric field. The tilt of these molecules is propagated to other molecules located near the center of the pixel electrode because of continuity of the liquid crystal. Thus, the liquid crystal molecules are oriented in substantially the same direction in the center part of the pixel electrode 19, whereby an improved viewing angle characteristic and transmittance are achieved.

Figure 5:
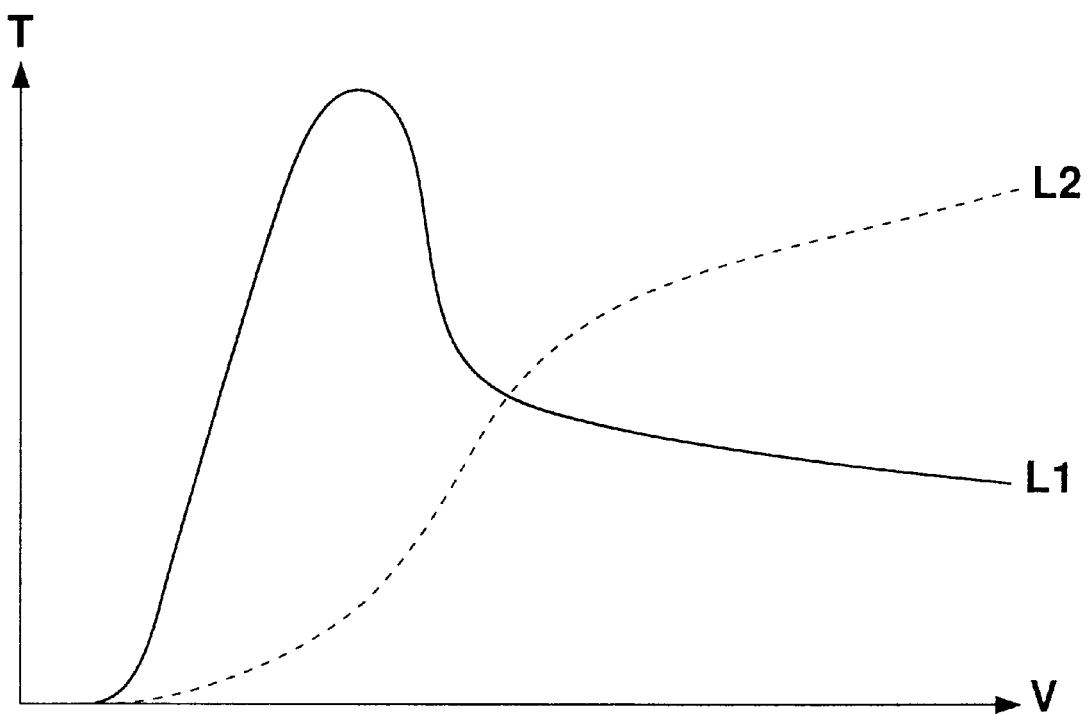
FIG. 5 is a graph plotting a transmittance as a function of a driving voltage.

Referring to FIG. 5, a relationship of an actuating voltage V and a transmittance T of the liquid crystal display of the above-described configuration is shown, in which a solid line L1 indicates a case when the product of the refraction anisotropy Δn and the cell gap d is large, and a broken line L2 indicates a case when the product is small. The product Δn·d of the refraction anisotropy Δn of the liquid crystal and the cell gap d is known as retardation. As seen from FIG. 5, to attain a given transmittance, a driving voltage range is wider when the product Δn·d is small. Since the response speed is proportional to the magnitude of the driving voltage, it is preferable that the product Δn·d be small. Also, the response speed is slower as the cell gap d becomes wider, and the speed is faster as the cell gap d becomes narrower.

Typically, the response speed τ is defined by τ=(τr+τd)/2, where τr is time taken to reach a transmittance of 90% upon application of the voltage, and τd is time taken before the transmittance is down to 10% after the application of voltage is stopped. The above equation is applicable in the range of $$(\tau r+\tau d)/2 \leq 80 \text{ [msec]} \tag{1}$$

Figure 6:
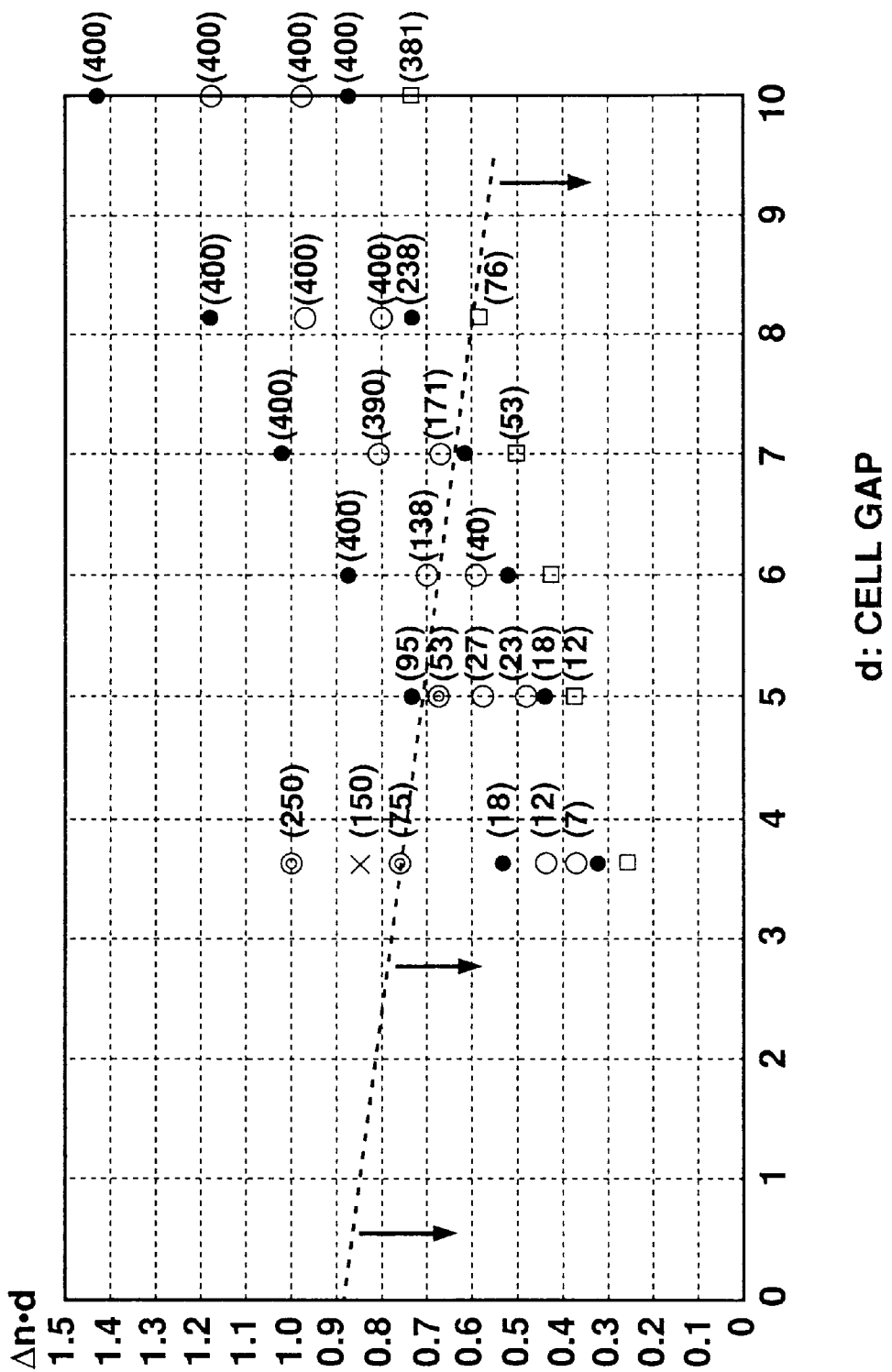
FIG. 6 is a graph plotting a response speed as a function of $\Delta n \cdot d$ and d.

Then, the response time was measured with Δn·d and d being changed, and the experimental results are shown in FIG. 6 in which the vertical axis indicates Δn·d and the horizontal axis indicates the cell gap d, and the numbers in the brackets next to the symbols ○, □, ⊙, ●, and X indicate the response time corresponding to the values of Δn·d and d.

For example, from top to bottom of the leftmost column of symbols, ⊙ indicates that d is 3.6 μm, Δn·d is 1, and the response time is 250 ms, X indicates that d is 3.6 μm, Δn·d is 0.85, and the response time is 150 ms, ⊙ indicates that d is 3.6 μm, Δn·d is 0.75, and the response time is 75 ms, ● indicates that d is 3.6 μm, Δn·d is 0.52, and the response time is 18 ms, ○ indicates that d is 3.6 μm, Δn·d is 0.42, and the response time is 12 ms, and another ○ indicates that d is 3.6 μm, Δn·d is 0.35, and the response time is 7 ms. Thus, it is found from the experimental results that Δn·d must be less than or equal to 0.77 at the cell gap d of 3.6 μm, in order to meet the LCD's applicable response time range of less than or equal to 80 ms.

When Δn·d is constant, the response speed is slower as the cell gap d becomes wider. If, for example, Δn·d is 0.75 and d is 3.6 μm, then the response speed will be 75 ms which is well within the applicable range. Once the gap d exceeds 5.0 μm, the response speed will be out of the applicable limit of 80 ms.

As indicated in the experimental results plotted in FIG. 6, a sufficient response speed can be obtained in an area indicated by solid line arrows under a dotted line in FIG. 6 where the relationship of Δn·d and d satisfies $$\Delta n \cdot d \leq -0.033*d+0.88 \tag{2}$$

Beyond the range defined in the expression (2), widening the cell gap d and narrowing the driving voltage range because of an acute VT characteristic as shown in FIG. 5 results in a significant drop of the response speed.

Therefore, Δn and the cell gap d have to be selected so as to satisfy the above expression (2) in order to reduce the response time.

As described above, the present invention achieves the reduced response time by setting the product Δn·d of the refraction anisotropy Δn of liquid crystal and the cell gap d to less than or equal to −0.033*d+0.88.

What is claimed is:

1. A vertically aligned type liquid crystal display, comprising:
   a vertically aligned liquid crystal layer containing vertically aligned liquid crystal molecules and disposed between a plurality of pixel electrodes and a common electrode, a orientation of said liquid crystal molecules being controlled by an electric field;
   wherein a refraction anisotropy Δn of the liquid crystal molecules of said liquid crystal layer and a distance d μm between said pixel electrodes and said opposing common electrode satisfy $$\Delta n \cdot d \leq -0.033*d+0.88.$$

2. The liquid crystal display according to claim 1, wherein said liquid crystal layer having the above relationship between the refraction anisotropy Δn and the distance d satisfies $$(\tau r+\tau d)/2 \leq 80 \text{ msec}$$

where τr is time taken to reach a transmittance of 90% upon application of a voltage, and τd is time taken before a transmittance is down to 10% after the application of voltage is stopped.

3. The liquid crystal display according to claim 1, wherein said common electrode opposing said pixel electrodes has an orientation window formed in an area corresponding to said pixel electrodes for controlling the orientation of said liquid crystal molecules for each pixel.

4. The liquid crystal display according to claim 1 being a transmission type liquid crystal display.

\* \* \* \* \*